Feb. 2, 1965  G. M. DAFFRON  3,167,878
TELESCOPIC LANDING NET
Filed April 29, 1963

INVENTOR.
Guy M. Daffron
BY
ATTORNEY

United States Patent Office 3,167,878
Patented Feb. 2, 1965

3,167,878
TELESCOPIC LANDING NET
Guy M. Daffron, Anaheim, Calif., assignor to
George H. Moore, Sterling, Colo.
Filed Apr. 29, 1963, Ser. No. 276,343
2 Claims. (Cl. 43—12)

This invention relates to facilities useful in the art and practice of angling, and more particularly to nets applicable through one-hand manipulation to the retrieval of hooked fish, and has as an object to provide a novel and advantageously improved such net.

A further object of the invention is to provide a novel and improved angler's landing net susceptible at option of extension-to-use condition and alternative retraction-to-compact encasement.

A further object of the invention is to provide a novel and improved angler's landing net amenable as an incident of one-hand manipulation to extension-to-use condition from a retracted state of compact encasement.

A further object of the invention is to provide a novel and improved angler's landing net adapted for convenient retraction to and retention in compact encasement with potential for immediate use.

A further object of the invention is to provide a novel and improved construction and operative correlation of elements in and as an angler's landing net of telescopic type.

A further object of the invention is to provide an angler's landing net of telescopic type that is capable of economical production, facile and convenient for intended use, sturdy and durable in exposure to the conditions and environments attending the practice of angling, and positive and efficient in attainment of the ends for which designed.

With the foregoing and other objects in view, my invention consists in the construction, arrangement, and operative combination of elements as hereinafter set forth, pointed out in the appended claims, and illustrated by the accompanying drawing, in which—

Nets suited for one-hand manipulation to effect landing of hooked fish have long been available to and utilized by anglers in a wide range of specific form and structure particularity characterized in common by an elongated rigid handle carrying at one end a loop frame engaged with and to distend the one open end of a net pouch. The manifest incovenience attending ready availability and use of such a facility when formed with the frame mounting the net fixed to and as a permanent extension from the handle to complete a unit of considerable length difficult of transport by the angler in association with other equipment and prone to snag and catch in the natural obstacles associated with many waters has stimulated efforts to devise a landing net of enhanced convenience and practicality, and the instant invention hence is directed to the provision of an improved landing net organization distinguished by convenient availability in any and every situation of potential use and advantageous facility of application to intended use through manipulations requiring but one hand of the operator.

Figures 3, 4:
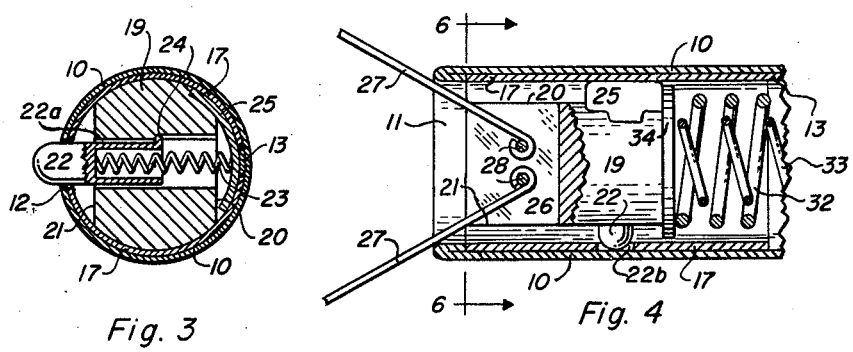
FIGURE 3 is a sectional view, on a relatively-enlarged scale, taken transversely through and substantially on the indicated line 3—3 of FIGURE 1.
FIGURE 4 is a fragmentary, detail, sectional view on the same scale as FIGURE 3 taken in the general plane of the net frame expanded as shown in FIGURE 2 longitudinally and substantially axially through the end of the case appearing in said latter view.
Figures 5, 6:
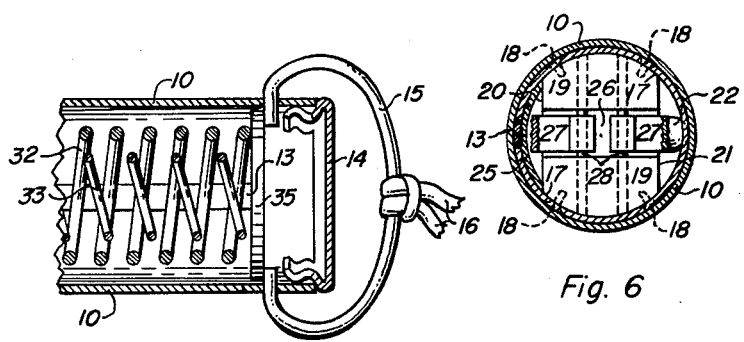
FIGURE 5 is a fragmentary, detail, sectional view similar to and on the same scale as FIGURE 4 taken longitudially and substantially axially through the end of the assembly according to FIGURE 1 remote from that shown in FIGURES 2 and 4.
FIGURE 6 is a sectional view on the same scale as FIGURE 4 taken transversely and substantially on the indicated line 6—6 of the view last noted.
Figure 7:
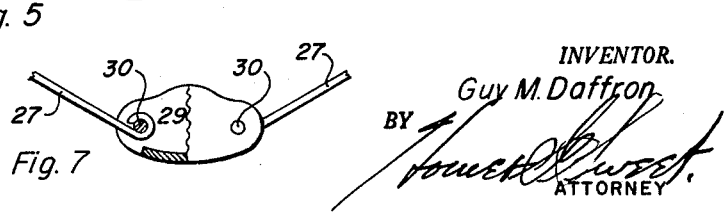
FIGURE 7 is a fragmentary, detail view, partially in section and on a relatively-enlarged scale, of the coupling utilized as shown in FIGURE 2 to pivotally inter-yoke complementary elements of the net frame.

As represented by the view of the drawing, a feature primary to the organization of the invention is a straight, rigid, elongated, tubular member 10 of suitable sturdy material sized and proportioned to serve as a handle for manipulation of a net pouch projected from one end thereof and to encase, as will hereinafter appear, the net pouch and associated components complementary thereto. Conditioned to effectuate the concept of the invention, the end of the member 10 designed to carry the net pouch as disposed for use, referred to for purposes of description as the forward end of the member, is infolded a short distance, or equivalently formed, to establish an annular fillet 11 fixedly and interiorly about said end of the member in a relative radial intrusion effective as a stop restricting in one direction the tubular passage through the member, a latch aperture 12 is provided in radial intersection with the wall of said member at a moderate spacing longitudinally and inwardly thereof from the other, or rearward, end of the member, and a straight rib 13 is fixedly or integrally associated with and interiorly of said member to extend substantially the full length thereof from the inner shoulder of the fillet 11 parallel to the member axis along the concave member wall zone opposed to that intersected by the latch aperture 12. The rearward end of the member 10 is normally closed by a cap 14 frictionally, or otherwise, separably coactable therewith and a C-clip 15 is sprung to engagement of its opposed free ends through diametrically-opposed holes intersecting the rearward end of the member adjacent and inwardly of the member from said cap, in which association the clip 15 is pivoted on the member to swing in freely-embracing relation with the cap in connection to a lanyard 16, or the equivalent, employable as may be desired to attach the member 10 to the person of the user, or elsewhere, as considerations of expedient availability may direct. The member 10 reciprocably houses a slide assembly characterized by a longitudinally-split, open-ended, tubular sleeve 17 formed of suitable sturdy material in a length considerably exceeding its diameter to conformably engage in freely-slidable relation within the member 10 and slidably embrace, where and as split, the rib 13 in a coaction inhibiting rotation of the sleeve relative to the member. Non-revolubly reciprocable longitudinally within the member 10 as set forth, the sleeve is retained against separation from the member at its forward end by the fillet 11 disposed to end-abut said sleeve at the forward limit of sleeve travel, as evidenced by the showing of FIGURE 4. The sleeve 17 houses and fixedly retains, as by means of screws 18, a generally-cylindrical block 19 conformably receivable within the sleeve in a relatively-reduced length and a disposition effective to substantially register the forward end of the block with the forward end of the sleeve, whereby to establish the rearward end of the sleeve as a socket opening to and rearwardly of the interior of the member 10. The cylindrical conformation of the block 19 is exteriorly interrupted by flat surfaces 20 and 21 symmetrically chordal of the block in spaced parallelism perpendicular to the diametric plane of the block bisecting the split in the sleeve 17 slidably coactable with the rib 13 and expediently, although not necessarily, extending the full length of the block to establish lenticular clearances within the sleeve 17 at each side of the block so flattened. Thus, when the sleeve and block assembly is associated with the member 10 to reciprocate therein in guided coaction with the rib 13, the flat block surface designated 20 is disposed to spacedly confront the split of the sleeve and the rib thereby embraced and the surface designated 21 is disposed to spacedly confront the arc of the member intersected by the latch aperture 12. Reciprocable in a bore 22a opening through and diametrically of the block 19 perpendicularly between the surfaces 20 and 21, a latch pin 22 is yieldably biased, as by an expansive coil spring 23 housed within the bore, to project from the block surface 21 and through an appropriately-registered opening 22b in the sleeve 17 for sliding engagement of its rounded outer end against the opposed concave arc of the member 10 in a disposition such as to register said outer end of the latch pin 22 with and for engagement through the latch aperture 12 when the sleeve and block assembly is suitably retracted in the range of its reciprocation relative to the member adjacent the rearward limit of assembly travel therein. The latch pin 22 is expediently conditioned, as by means of a stop lug 24 offset outwardly from its inward end to coaction with a channel radially enlarging a suitable length portion of the bore housing the same, to limit and determine outward projection of the pin in reaction to the spring 23 in an extent effective to establish a secure latching coaction of the pin with the latch aperture 12, as exemplified by FIGURE 3, and since the end of the bore opening through the block surface 20 exposes the corresponding end of the spring 23 to bear against the rib 13 it is advisable that other, and relatively fixed, abutment be provided for the end of the spring so exposed, such, for example, as an arcuate retainer plate 25 keyed in recessed engagement with the block 19 within and across the split interrupting the sleeve 17 to overlie the adjacent end of the bore in opposition to the influence of the spring 23, all in a manner feasibly accommodating assembly and disassembly of the latch and block combination.

Figure 1:
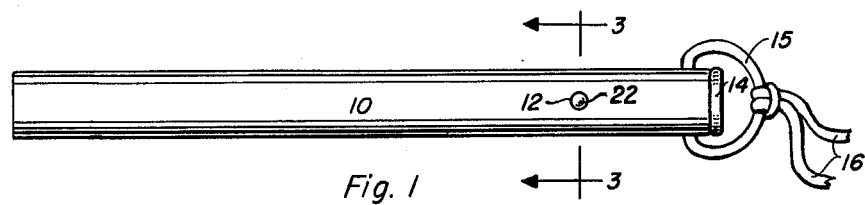
FIGURE 1 is a side elevational view of a typical embodiment of the invention as retractively encased for convenient availability and immediate use.
Figure 2:
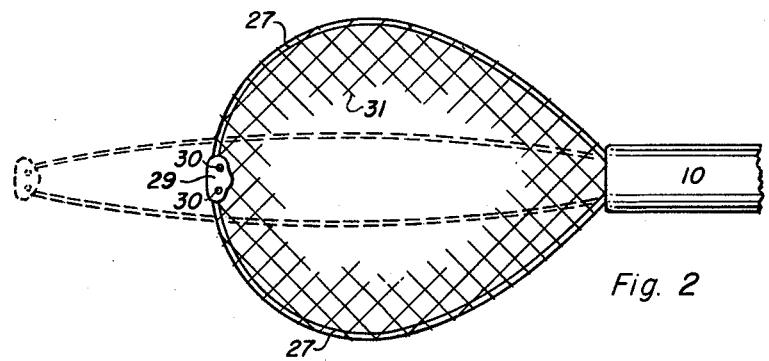
FIGURE 2 is a partial plan view, at a right angle relative to the aspect of FIGURE 1, of the net component as extended for use from the appropriate end of the assembly shown in the preceding view, an alternative position of net frame adjustment being represented by broken lines in the view.

The forward end of the block 19 housed by the sleeve 17 is deeply and diametrically interrupted by a parallel-walled notch 26 disposed to open axially and laterally of the block between planes preferably parallel to the axis of the latch pin 22 and the correlative bore in an open width of wall plane separation suited to receive and adjustably accommodate the corresponding ends of a pair of complementary frame arms 27 therein independently secured in pivotal attachment to the block 19 by means of hinge rods 28 fixed in the separated segments of the block to perpendicularly traverse said notch in spaced parallelism laterally thereof and to therein connect with and through eyes similarly terminating the said arms. Comprised from spring material formed and tensioned to normally manifest a pronounced longitudinal curvature while yet yieldable to pressures applied with arm-straightening effect, the said arms connect with the block 19 as above described in a correlation of normal curvature such as to define a widely-open loop characterized by opposed juxtaposition of the arm ends remote from the block and are of like length suited in a straightened condition of the arms for cased reception within the interior length of the member 10 that is open and unobstructed when the sleeve and block assembly is latched by means of the pin 22 in its relatively-retracted position. The opposed outer ends of the arms 27 are pivotally interlinked in any appropriate manner, as, for example, by means of a transversely U-shaped clip 29 adapted to loosely embrace the outer, eye-terminated ends thereof in independent hinge connection by means of pins 30 therewith. Organized and interlinked as shown and described, the complementary arms 27 provide a loop frame whereto is attached by the margin of its access opening a conventional net pouch, or dip net, 31 in a usual association therewith such as to distend and hold open the access to the net through the tensioned resilient influence of the arms when the latter are extended from the forward end of the member 10 in the positions they automatically assume at the forward limit of sleeve and block assembly travel therein as determined by the fillet 11, whereby as exemplified by FIGURE 2, to condition the facility for use in a customary manner in reaction to manipulations applied through the member 10 functioning as a handle for the open net. Alternatively, as should be readily apparent, the arms 27 may be manually compressed with straightening effect, as indicated by the broken line shown in FIGURE 2, the net wrapped and compacted thereabout, and the result urged to reception and encasement within the open barrel of the member 10 as the sleeve and block assembly concomitantly shifts rearwardly in the member until the latch pin 22 snaps into coaction with the latch aperture 12 to thereby protectively house and retain the frame and net components readily available for use in a compact arrangement practical and convenient of employment.

Qualifying the organization illustrated and thus far described for positive automatic extension of the net frame and net to expanded use condition in reaction to manipulation by but one hand of an operator, expansive spring means preferably in the form of complementarily-internested coil springs 32 and 33 is housed within the member 10 in end-bearing engagement between a washer 32 closing over the rearward end of the block 19 interiorly of the socket end of the sleeve 17 and a similar washer 35 retained transversely of the reaward end of the member by and against the intruded ends of the C-clip 15, whereby to apply the influence of the springs 32 and 33 directly to the end of the block 19, to confine the forward ends of said springs within the socket skirt of the sleeve, and to perfect an organization whereof the components may be removed and replaced through the rearward end of the member opened with convenience merely by removing the cap 14 and springing the ends of the C-clip away from connection with the member. Obviously, the size and expansive power of the springs 32 and 33 are suitably proportioned to provide for feasible manual compression thereof between the washer 35 and the sleeve and block assembly when the latter is latched at the rearward limit of its reciprocatory range and to assure prompt shift of said sleeve and block assembly to the forward limit of its reciprocatory range with concomitant ejection and expansion of the net when the latch pin 22 is pressed against the bias of its spring 23 to release from the latch aperture 12.

The practicality, use advantages, and mode of operation distinguishing the invention should be fully manifest as hereinbefore developed.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A telescopic landing net comprising a tubular handle having open forward and rearward ends formed with a radially-intruding rib substantially coextensive with and fixedly paralleling the axis thereof, an annular fillet fixedly and interiorly intruding radially about the forward end thereof, and means defining an aperture radially thereof inwarly adjacent its rearward end, a cylindrical, open-ended, longitudinally-split sleeve reciprocably housed in said handle in rotationally-immobilized coaction with said rib and end-registered opposition to said fillet thereby limiting sleeve travel forwardly of the handle, a block of less length than said sleeve secured therewithin in substantially coplanar registration of the block and sleeve ends opposed to said fillet attended by provision of a socket in and opening rearwardly of the handle from said sleeve, a resiliently-expansible, collapsible, net-equipped frame operatively connected to the end of said block directed forwardly of the handle and outstanding from said block longituinally of the handle for extension and retraction relative to and through the forward end of the handle in reaction to shift of said sleece and block within the handle, a C-clip intrusively engaged at its free ends through and diametrically of the rearward end of the handle to swing in freely-embracing relation therewith, an abutment washer loosely transverse of the handle inwardly thereof adjacent and retained against outward shift by the intruded ends of said C-clip, resiliently-expansive means within the handle between end engagement with said abutment washer and oppoiste end reception in the sleeve socket yieldably biasing said sleeve away from the washer for consequent extension of the net-equipped frame outwardly from the forward end of the handle, a detent spring-biased in diametric association with said block and sleeve for radial extension through the sleeve to latching engagement with the aperture adjacent the rearward end of the handle when the net-equipped frame is retracted within the handle, and a cap deachably closing the rearward end of the handle.

2. The organization according to claim 1, wherein said block has a bore and said detent is a round-nosed latch pin shiftably housed in a bore through the block in the diametric plane of the handle including the rib longitudinal thereof with the nosed end of the pin directed away from said rib, said sleeve having an aperture through the side of the sleeve remote from the rib accommodating the projection of the nosed end of the pin through the sleeve and adapted to dispose said pin in sliding engagement against the inner wall face of the handle opposed to the rib, complementary means on said pin and in said bore coacting to limit projection of the pin away from the rib, a retainer plate closing interiorly of the sleeve over the shift path of the pin through the bore otherwise open to said rib, an expansive coil spring in end-bearing engagement between said retainer plate and pin biasing the latter to the limit of its shift range outwardly of the sleeve, and the aperture being formed radially and inwardly adjacent the rearward end of the handle and located to intersect the path of pin nose travel longitudinally of the handle at an appropriate spacing from the adjacent end of the handle and in a size to freely receive the nosed end of the pin.

References Cited in the file of this patent

UNITED STATES PATENTS

| 1,077,481 | Levy | Nov. 4, 1913 |
| 2,501,975 | Van Millingen | Mar. 28, 1950 |
| 2,544,926 | Keeney | Mar. 13, 1951 |
| 2,630,646 | Jensen et al. | Mar. 10, 1953 |